(No Model.)
J. M. ROBINSON.
FERTILIZER DISTRIBUTER ATTACHMENT.
No. 466,260. Patented Dec. 29, 1891.
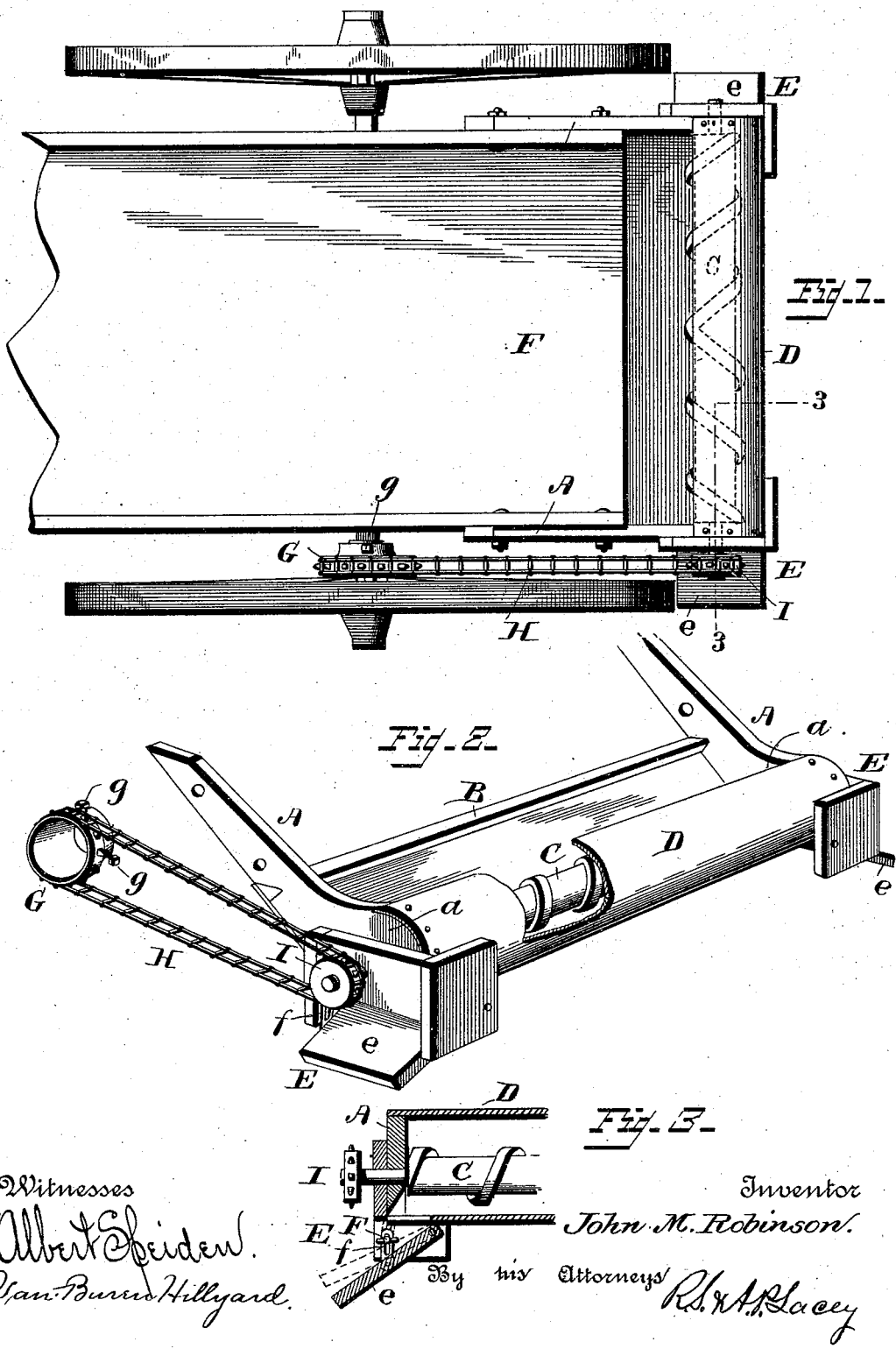

UNITED STATES PATENT OFFICE.

JOHN MILTON ROBINSON, OF KNOX POINT, LOUISIANA.

FERTILIZER-DISTRIBUTER ATTACHMENT.

SPECIFICATION forming part of Letters Patent No. 466,260, dated December 29, 1891.

Application filed August 27, 1891. Serial No. 403,863. (No model.)

*To all whom it may concern:*

Be it known that I, JOHN MILTON ROBINSON, a citizen of the United States, residing at Knox Point, in the parish of Bossier and State of Louisiana, have invented certain new and useful Improvements in Fertilizer-Distributer Attachments; and I do hereby declare the following to be a full, clear, and exact description of the invention, such as will enable others skilled in the art to which it appertains to make and use the same.

This invention relates to a fertilizer-distributer attachment for drilling compost and manure with equal facility whether the same is in a dry or moist condition.

The object of the invention is to provide an attachment which can be readily applied to any ordinary farm-wagon and which will operate satisfactorily and efficiently. By means of this attachment a second handling of the manure is obviated, the wagon being driven into the field and the fertilizer distributed by applying the attachment thereto.

A further object of the invention is to avoid increasing the draft to any very great degree when the attachment is applied thereto.

The improvement consists of the novel features and the peculiar construction and combination of the parts, which will be hereinafter more fully described and claimed, and which are shown in the annexed drawings, in which—

Figure 1 is a top plan view of the attachment and the rear end of a farm-wagon, showing the attachment applied thereto. Fig. 2 is a view of the attachment, the spur-rim, and the spur-chain, parts being broken away to better show the details of construction. Fig. 3 is a section of one end of the attachment on the line 3 3 of Fig. 1, showing the adjustment of the chute by dotted lines.

The invention comprises side pieces A A, which have the ends *a a* expanded and curved, the cross-bar B, the trough D, of sheet metal, which is secured at its ends to the lower curved ends *a a* of the said side pieces and at one edge to the cross-bar, the feed-shaft C, located in the bottom of the trough and journaled at its ends in the said side pieces, and the delivery-spouts E at each end of the trough.

The side pieces A are sufficiently long to be securely bolted or otherwise fastened to the sides of a farm-wagon, as F, and project in the rear thereof a proper distance to support the trough D wholly in the rear of the said wagon. The cross-bar B strengthens the side pieces and the trough and comes beneath the floor of the wagon-body. The feed-shaft C is provided with a right and a left spiral thread, each extending from the center toward the ends of the said shaft to feed the fertilizer along in the trough in a positive manner toward the delivery-spouts. The trough is provided with delivery-openings at each end, through which the fertilizer escapes into the spouts E. The chutes *e*, forming the bottoms of the delivery-spouts, are pivoted at their rear or inner ends and are adjustable at their front or outer ends to adapt the delivery or drill to the width of the rows. Any suitable means may be provided to hold the chutes in the required position—as, for instance, the slotted brace *f* and the binding-screw F.

The feed-shaft is operated from one of the hind wheels of the wagon, and to effect this in an economical manner the spur-rim G is provided and fitted on the hub, being held thereon by the binding-screws *g*. The spur or sprocket chain H passes around the spur-rim G and the spur-pinion I on a journal of the feed-shaft.

A wagon being selected to haul manure to the field is provided with a spur-rim G prior to being loaded. The attachment can be applied prior to or after the wagon has been loaded. The chutes being adjusted to properly deliver the manure, the wagon is drawn over the field. The manure is fed by hand from the wagon to the trough. The feed-shaft forces it to the delivery-spouts, from which the fertilizer is deposited on the ground.

It will be observed that the expanded ends *a a* of the side pieces serve to close the ends of the trough. The latter, being sheet metal, is shaped around and secured directly to the curved ends of the said trough. The rear and bottom portion of the trough is circular in cross-section, thereby permitting the feed-shaft to act to the best possible advantage.

Having thus described my invention, what I claim, and desire to secure by Letters Patent, is—

The hereinbefore shown and described fertilizer-distributer attachment to be applied to an ordinary farm-wagon, composed of side pieces to be attached to the wagon, the lower portions of the said side pieces being expanded and terminating in curved ends, a trough conformed and secured to the curved ends of the said side pieces and having discharge-openings at each end, a cross-bar B, secured at its ends to the side pieces and constructed to come beneath the wagon and support the inner edge of the said trough, a feed-shaft located in the trough and journaled at its ends in the said side pieces and having a right and a left spiral thread to feed the fertilizer from the middle toward the ends of the trough, discharge-spouts at the ends of the said trough, having adjustble chutes, a spur-rim to be secured to the hub of the said wagon, a spur-pinion on the feed-shaft, and a spur-chain to transmit motion from the said spur-rim to the feed-shaft, substantially as and for the purpose set forth.

In testimony whereof I affix my signature in presence of two witnesses.

JOHN MILTON ROBINSON.

Witnesses:
    GUS H. WHITE,
    S. C. ROGERS.